United States Patent [19]
Chiou

[11] Patent Number: 5,472,015
[45] Date of Patent: Dec. 5, 1995

[54] Y-TYPE CYLINDER-CONTROLLED VALVE ASSEMBLY

[75] Inventor: Shun-hsing Chiou, Taipei, Taiwan

[73] Assignee: Wae Yen Enterprise Co., Ltd., Taipei, Taiwan

[21] Appl. No.: 340,326

[22] Filed: Nov. 14, 1994

[51] Int. Cl.⁶ ............................................. F16K 31/122
[52] U.S. Cl. ........................................ 137/556; 251/63.5
[58] Field of Search ........................ 251/62, 61.1, 61.5, 251/284, 63.5, 63.6, 63, 318, 319, 321, 324; 137/551, 553, 556, 556.3, 556.6

[56] References Cited

U.S. PATENT DOCUMENTS

| | | | |
|---|---|---|---|
| 4,270,727 | 6/1981 | Norman | 251/63.6 X |
| 5,280,872 | 1/1994 | Yamanaka | 251/61.5 |

FOREIGN PATENT DOCUMENTS

| | | | |
|---|---|---|---|
| 2241550 | 3/1974 | Germany | 251/635 |
| 2252532 | 5/1974 | Germany | 251/63.5 |

*Primary Examiner*—Martin P. Schwadron
*Assistant Examiner*—Kevin L. Lee
*Attorney, Agent, or Firm*—Browdy and Neimark

[57] ABSTRACT

Disclosed is a Y-type cylinder-controlled valve assembly which mainly consists of a valve body and a cylinder having a reduced upper portion. The reduced upper portion of the cylinder has an inner diameter smaller than the outer diameter of a piston in the cylinder and thereby serves as a means to define the maximum travel of the piston. Moreover, the valve body has an inclined cylinder-receiving sleeve which has an enlarged inner diameter than that of a conventional Y-type valve assembly and thereby effectively prevents the valve thereof from being frictionally stuck in the inclined sleeve due to any deviation of the valve by fluid passing through the valve body.

3 Claims, 3 Drawing Sheets

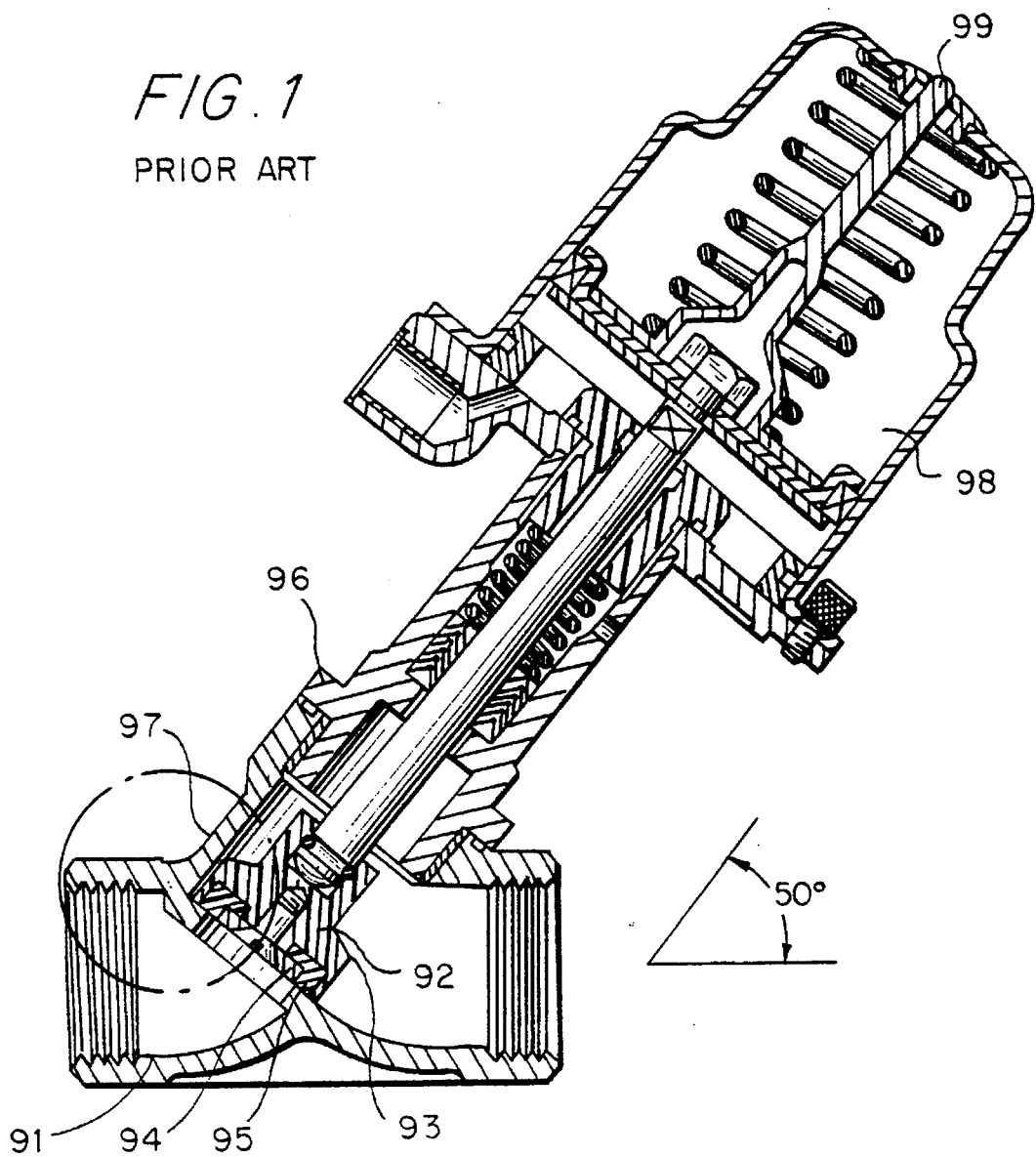
FIG.1
PRIOR ART
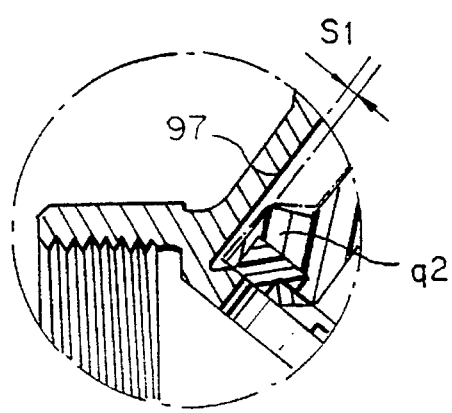
FIG.1.1
PRIOR ART

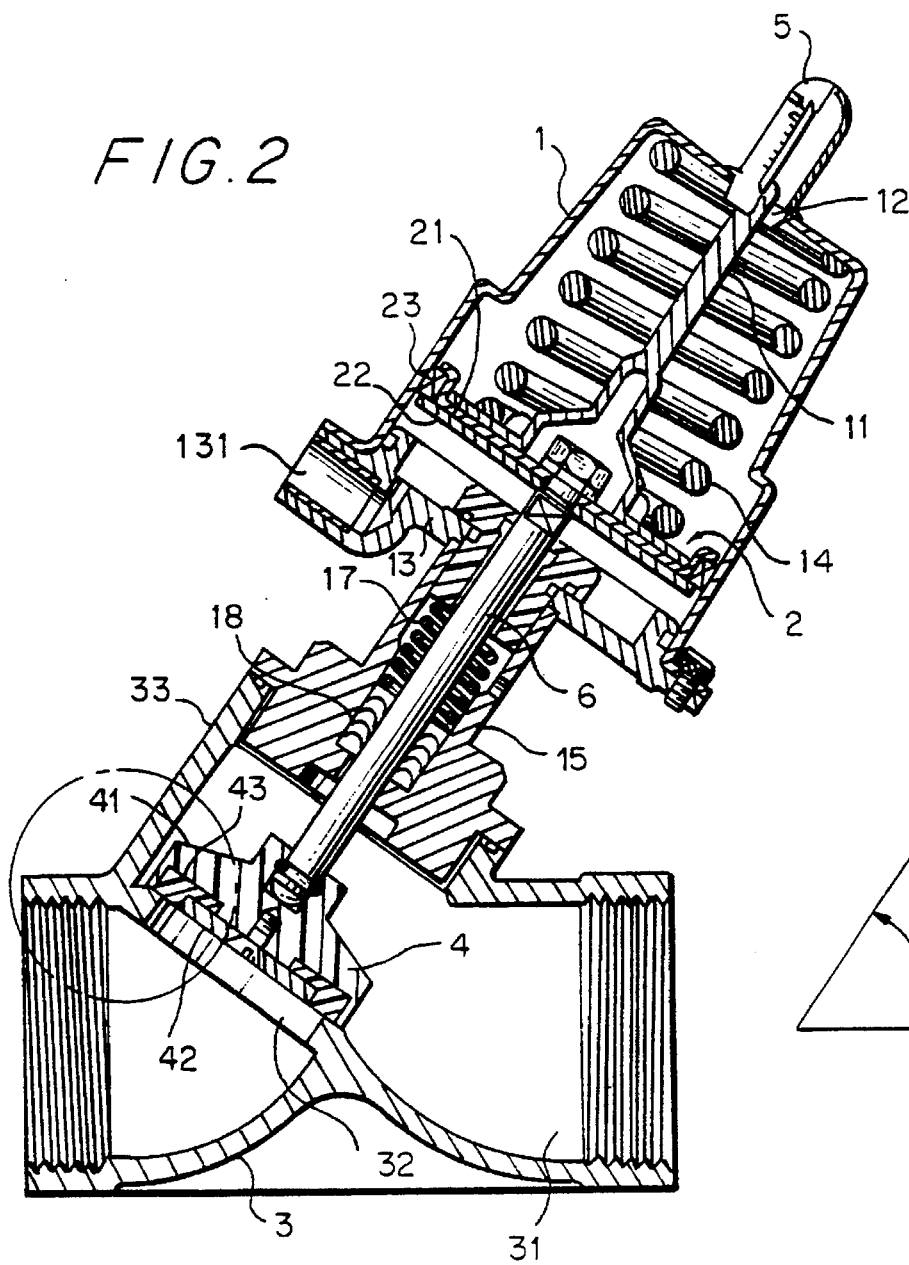
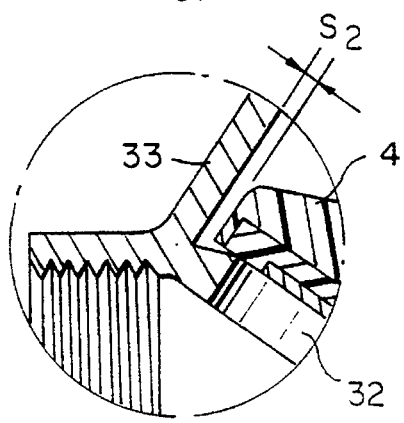

FIG. 3
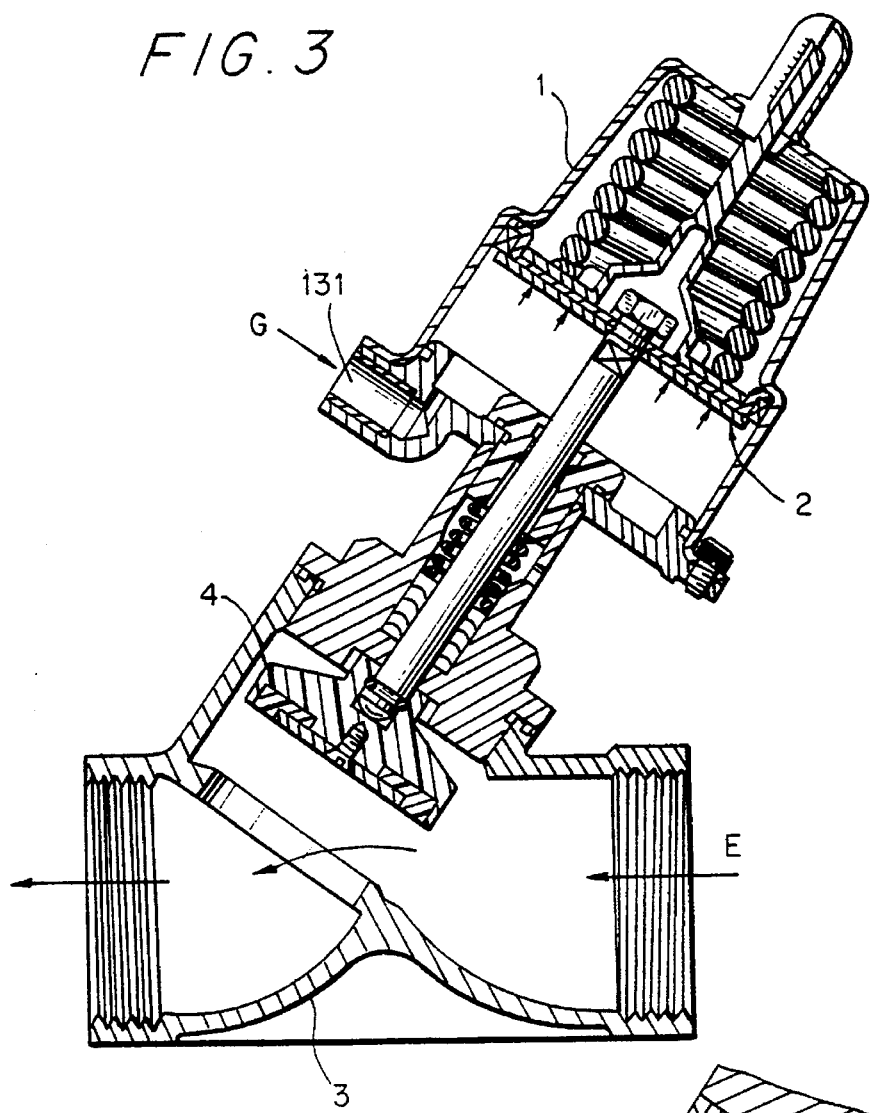
FIG. 3.1
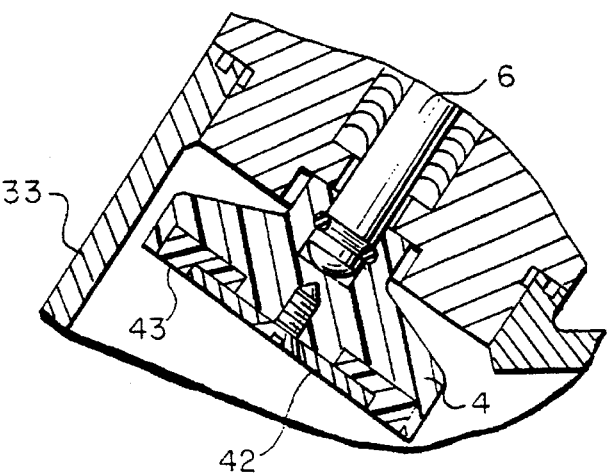

Y-TYPE CYLINDER-CONTROLLED VALVE ASSEMBLY

BACKGROUND OF THE INVENTION

The present invention relates to a Y-type cylinder-controlled valve assembly, and more particularly to a valve assembly in which cylinder and piston are used to control the travel and stop of the valve thereof. The specially designed valve body facilitates the smooth open and close of the valve and prevents the valve from being easily stuck in the valve body.

In a conventional cylinder-controlled valve, the fluid in the valve body flows in a direction normal to the direction of displacement of the piston to open or close the valve, and is therefore forced to wind its way in the valve body. This reversely disturbs and drops the flow while causes pressure drop.

To solve this problem, the Y-type cylinder-controlled valve assembly has been developed. The Y-type cylinder-controlled valve assembly is characterized in the almost straight flow passage in the valve body and that the valve controlling the open and close of the valve body moves in a direction at an angle of 50 degrees from the flow passage. With this design, the fluid in the valve body would not be stopped and disturbed while the problem of pressure drop can be improved.

FIG. 1 illustrates a conventional Y-type cylinder-controlled valve assembly, in which a valve body 91 has an internal valve 92 whose top is provided with an inclined shoulder 93. A seal ring 95 can be fixed into a recess formed at the bottom side of the valve 92 by means of a washer 94. With this structure, the control valve may conveniently and effectively prevent any leakage of fluid from the valve as well as reduce the back pressure of the valve to facilitate the instant open of valve body.

In the above described conventional Y-type cylinder-controlled valve assembly, when the valve body is opened, the valve 92 shall keep rising until it moves into a cavity formed at the bottom end of a coupling sleeve 96. That is, the valve 92 is stopped when its top surface contacts the bottom cavity of the coupling sleeve 96 and therefore, the valve 92 has to bear considerably large force at this point. And, as shown in FIG. 1.1, the clearance left between the valve 92 and the valve body wall 97 is so small that the valve 92 is easily stuck in the valve body 91 whenever the valve 92 is biased under the fluid pressure and contacts the slant side wall 97 of the valve body 91.

Another disadvantage existed in the conventional Y-type cylinder-controlled valve assembly is that no protective means is provided over top end of the indicator 99 inside the cylinder 98. Dust and moistures may easily enter the cylinder 98 from the top end of the indicator 99 and damage the piston. Since the Y-type cylinder-controlled valve assembly is frequently used in a severe environment, the invasion of any foreign material into the cylinder shall be specially noted and avoided.

Moreover, the valve 92 inclinedly extends into the fluid passage at an angle of 50 degrees in the direction of fluid flow, forming a much shorter distance between the cylinder 98 and the pipe connected to and extending from the fluid inlet of the valve body 91, which reversely influences the convenience in connecting the pipe. When a flange is used in such pipe connection, such Y-type valve assembly with 50-degree inclined valve is difficult to meet the JIS specification.

SUMMARY OF THE INVENTION

It is therefore a primary object of the present invention to provide an improved Y-type cylinder-controlled valve assembly in which the valve in an open travel is finally stopped by the pressing of the piston in the cylinder against a reduced portion of the cylinder, that is, the valve itself is no longer used as the stopping means in its travel. This reduces the force the valve bears and may therefore extends its life.

Another object of the present invention is to provide a Y-type cylinder-controlled valve assembly in which the clearance left between the inclined valve body wall and the valve is increased to prevent the valve from being stuck in the valve body.

A further object of the present invention is to provide a Y-type cylinder-controlled valve assembly which has a transparent dust cap provided on the cylinder to seal the top end of the indicator and thereby prevents any dust and moisture from entering into the cylinder without interfering with the indication of opening of the valve.

A still further object of the present invention is to provide a Y-type cylinder-controlled valve assembly in which the cylinder is inclinedly connected to the valve body at an angle of 55 degrees in the direction of the flow passage, allowing a larger distance between the cylinder and the coupled pipe for easy installation.

BRIEF DESCRIPTION OF THE DRAWINGS

The above objects and advantages as well as other functions of the present invention can be best understood through the following detailed description of the preferred embodiment and the accompanied drawings, wherein FIG. 1 is a sectional view showing a conventional Y-type cylinder-controlled valve assembly;

FIG. 1.1 is a partially enlarged sectional view of FIG. 1, in which the dotted line shows the displacement of the valve under fluid pressure which causes the valve to contact the valve body wall and be stuck in the valve body;

FIG. 2 is a sectional view showing a preferred embodiment of the Y-type cylinder-controlled valve assembly according to the present invention, in which the valve is at a closed position;

FIG. 2.1 is a partially enlarged sectional view of FIG. 2, showing the increased clearance between the valve and the valve body wall;

FIG. 3 is a sectional view similar to FIG. 2, in which the valve is at an open position and the piston is stopped by the reduced portion of cylinder; in the drawing, stream line with reference number E indicates the flow direction of the fluid in the valve body and arrow G indicates the flow of high-pressure gas; and FIG. 3.1 is a fragmentary, enlarged sectional view, showing the structure of the valve according to the present invention.

DETAILED DESCRIPTION OF THE PREFERRED EMBODIMENTS

Please refer to FIG. 2. A Y-type cylinder-controlled valve assembly according to the present invention is mainly used for connection in a pipeline to control the flow of fluid in the pipeline by opening or closing a valve 4 in a valve body 3 through the movement of a piston 2 in a cylinder 1 connected to the valve body 3.

The valve body 3 is so formed that it has an almost straight fluid passage 31, an internal opening 32 which can be sealed by the valve 4 to stop fluid flow in the passage 31, and an inclined sleeve 33 which is on the same plane with the passage 31 and an angle of fifty-five (55) degrees is contained between it and the passage 31. The cylinder 1 extends into the inclined sleeve 33, giving the whole valve assembly a substantially Y-shaped profile.

A transparent and hollow dust cap 5 is provided at a top of the cylinder 1. The length of the duct cap 5 is long enough to allow an indicator 11 to move within the travel of piston 2. Scales are marked on the surface of dust cap 5. The particular scale to which the top of indicator 11 reaches indicates the position of piston 2 in the cylinder 1. The dust cap 5 fitly closes the hole from which the indicator 11 extends out of the cylinder 1 and thereby prevents dust and moisture from entering into the cylinder 1.

The indicator 11 extends from its other end toward the other end of the cylinder 1 via a bushing 12. The piston 2 consists of a piston seat 21, a piston fixing board 22 provided below the piston seat 21, and a shaft seal 23. A spring 14 is provided in the space between the piston 2 and the top of cylinder 1 to provide the recovery force needed to push the piston 2 downward. The cylinder 1 has an upper portion of which the inner diameter is smaller than the outer diameter of piston 2 to form an upper limit of travel for the piston 2 (FIG. 3 shows the piston 2 reaching this maximum travel), and a lower portion in which the piston 2 may move freely. The movement of piston 2 is actuated by sending high-pressure gas into the cylinder 1 via a port 131 provided at a cylinder seat 13. When the high-pressure gas is released from the cylinder 1, a recovery force from the spring 14 causes the piston 2 to return to its position as shown in FIG. 2.

A main shaft 6 connected at one end to a bottom center of the piston 2 passes through the cylinder seat 13 and a coupling sleeve 15, and extends into the inclined sleeve 33 with its another end connecting with the valve 4. A compensation spring 17 and a V-profiled seal ring 18 are mounted in the coupling sleeve 15 around the main shaft 6.

The valve 4 according to the present invention may have shorter height with a shoulder 41 formed at its top portion. A recess formed at its bottom allows a seal ring 43 to be fixed therein by means of a washer 42. The area between the inner and the outer diameters of the seal ring 43 is so designed that it allows the valve 4 to properly seal the opening 32 and prevent any leakage of fluid from the opening 32 when the valve 4 is at its close position. With this design, the valve 4 shall bear a reduced back pressure and may be opened in an instant. FIG. 3.1 is an enlarged view showing the detailed structure of valve 4.

The movement of valve 4 to and from the opening 32 is controlled by the piston 2 inside the cylinder 1. The valve 4 reaches its maximum travel when the piston 2 is raised to press against the reduced upper portion of cylinder 1 and is stopped therein. That is, the cylinder 1 shall bear full impact from the piston 2 when the valve 4 is completely opened. Since the valve 4 itself is not subjected to any external force other than the fluid pressure inside the passage 31, it can be designed to have a largely reduced height. The advantage of a shortened valve 4 is that the fluid flowing through the valve 4 shall encounter lower resistance and the occurance of turbulent flow and pressure drop in the valve body can be minimized. Moreover, the valve 4 is not subject to damage and may have extended life of use because the piston 2 serves as a stopping means in the travel of valve 4 and largely reduces the force directly applied to the valve 4. Since the fluid pressure acting on the shortened valve 4 is relatively reduced, the situation of deviated and stuck valve 4 in the inclined sleeve 33 is minimized, too.

To further solve the problem of a stuck valve 4, the inclined sleeve 33 according to the present invention is so designed to have an enlarged inner diameter, as shown in FIG. 2.1, so that a larger clearance 82 is formed between the periphery of valve 4 and the inner wall of the inclined sleeve 33 to prevent the valve 4 from being frictionally stuck by the inclined sleeve 33 due to slight deviation from its center. From FIGS. 1.1 and 2.1, it can be seen that the clearance S2 of the present invention is functionally superior than the clearance S1 in a conventional Y-type cylinder-controlled valve assembly.

The present invention is superior than the conventional Y-type cylinder-controlled valve in its transparent but scaled dust cap 5 which not only prevents foreign materials from entering into the cylinder 1 but also conveniently indicates correct position of the valve 4 in the valve body.

As shown in FIG. 2, the cylinder 1 inclinedly connects with the valve body 3 at an angle of 55 degrees which provides larger space for conveniently connecting pipes to the valve body than a 50-degree Y-type valve will do. This is specially advantageous when a flange is used in the connection of pipe with valve assembly to meet JIS specifications.

The reduced upper portion of the cylinder 1, when comparing with the cylinder 98 as shown in FIG. 1, serves not only to stop the piston 2 but also to guide the spring 14 and thereby prevents the same from twisting or breaking due to any deviation and bending of it when it is compressed.

What is claimed is:

1. A Y-type cylinder-controlled valve assembly comprising:

a valve body having a through passage for fluid flow, a sleeve inclinedly extending outward from said passage, and an opening formed at an end of said inclined sleeve for communicating said sleeve with said passage;

a cylinder connected to said inclined sleeve by means of a coupling sleeve and consisting of an inner piston, a main shaft extending from a bottom side of said piston toward and above said opening in said valve body, a lower cylinder seat having a port for sending high-pressure gas into said cylinder to actuate said piston, and a spring bearing against said piston to provide recovery force for said piston to return to an original position thereof; and a valve provided at a free end of said main shaft such that said valve is moved by said piston to open or close said opening is said valve body; wherein said cylinder has a reduced upper portion of which the inner diameter is smaller than the outer diameter of said piston, and a lower portion in which said piston reciprocates; said reduced upper portion of said cylinder serving as a means to stop said piston and thereby defining a maximum travel of said piston to minimize the force directly applied to said valve when said valve is completely moved away from said opening toward said cylinder; and wherein said cylinder is coupled at an inside end thereof distal said valve to an indicator, said indicator extending out of a top end of said cylinder and being covered by a transparent hollow dust cap which seals said top of said cylinder.

2. The Y-type cylinder-controlled valve assembly according to claim 1, wherein said dust cap has scales provided thereon.

3. A Y-type cylinder-controlled valve assembly comprising:

- a valve body having a through passage for fluid flow, a sleeve inclinedly extending outward from said passage, and an opening formed at an end of said inclined sleeve for communicating said sleeve with said passage;
- a cylinder connected to said inclined sleeve by means of a coupling sleeve and consisting of an inner piston, a main shaft extending from a bottom side of said piston toward and above said opening in said valve body, a lower cylinder seat having a port for sending high-pressure gas into said cylinder to actuate said piston, and a spring bearing against said piston to provide recovery force for said piston to return to its original position thereof; and
- a valve provided at a free end of said main shaft such that said valve is moved by said piston to open or close said opening is said valve body; wherein
- said cylinder has a reduced upper portion of which the inner diameter is smaller than the outer diameter of said piston, and a lower portion in which said piston reciprocates; said reduced upper portion of said cylinder serving as a means to stop said piston and thereby defining a maximum travel of said piston to minimize the force directly applied to said valve when said value is completely moved away from said opening toward said cylinder; and wherein
- said inclined sleeve and, said cylinder, and said passage contain an angle of fifty-five degrees between them on a plane passing through a central axis of said valve body.

* * * * *